July 19, 1927.
L. AUNES
1,636,035
COMBINATION SERVICE STAND
Filed Nov. 12, 1925 2 Sheets-Sheet 1
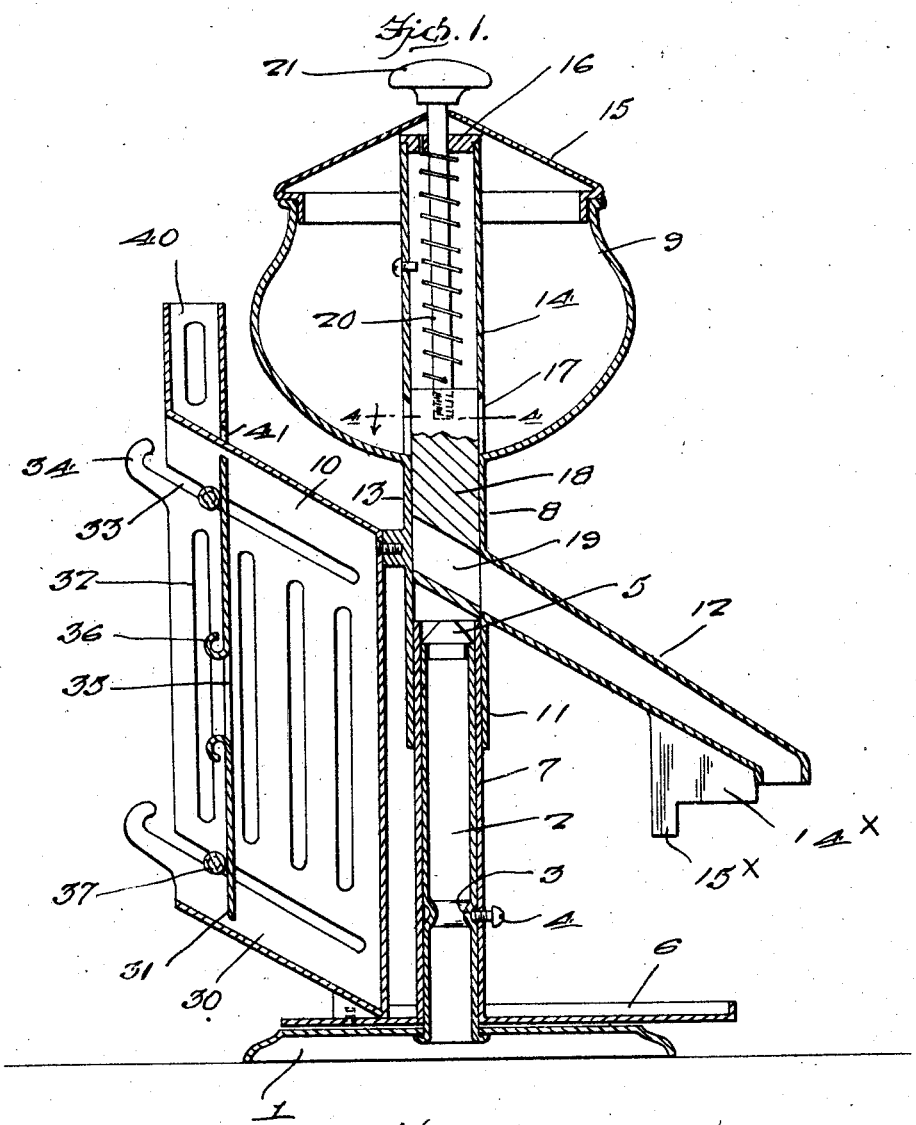
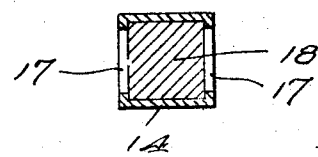
Inventor
L. Aunes
By Clarence A. O'Brien
Attorney July 19, 1927.
L. AUNES
1,636,035
COMBINATION SERVICE STAND
Filed Nov. 12, 1925
2 Sheets-Sheet 2
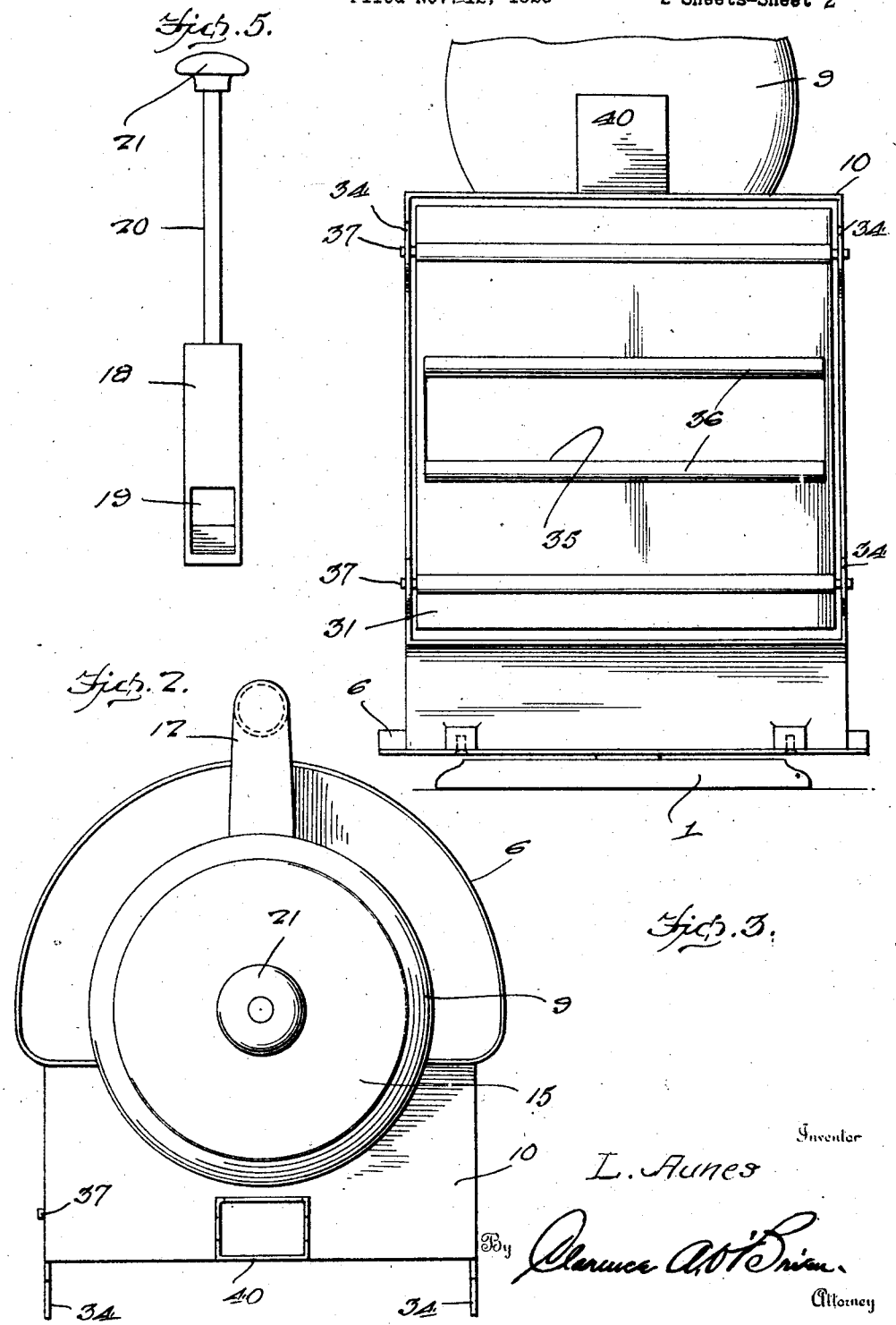

Patented July 19, 1927.

1,636,035

UNITED STATES PATENT OFFICE.

LEONARD AUNES, OF QUINCY, MASSACHUSETTS.

COMBINATION SERVICE STAND.

Application filed November 12, 1925. Serial No. 68,626.

My present invention pertains to means for dispensing or serving the various articles used at a table, lunch counter, or the like.

The general object of my said invention is the provision of a device adapted to facilitate the supply of several different things to persons seated at a table or lunch counter, and this while economizing in the use of the things supplied with a view to preventing waste thereof.

Other objects and practical advantages of the invention will be understood from the following description and claims when the same are read in connection with the drawings, accompanying and forming part of this specification, in which:

Figure 1 is a vertical section of the device constituting the best practical embodiment of my invention of which I am cognizant.

Figure 2 is a top plan view of the device.

Figure 3 is a rear view of the device.

Figure 4 is a horizontal section taken through the vertical housing in the plane indicated by the line 4—4 of Figure 1.

Figure 5 is an elevation of the transferrer for effecting the service of sugar or the like in small lots.

Similar numerals of reference designate corresponding parts in all the views of the drawings.

Among other elements my novel device comprises a stand 1 from which rises a fixed stem 2, having at 3 a circumferential groove for the reception and movement of the inner end of a screw 4 for a purpose hereinafter described.

The stem 2 is tubular in form, by preference, and is provided at its upper end with a hardened steel tapered plug 5, Figure 1.

Arranged slightly above the base 1 is a tray 6, and fixed to and rising from said tray is a tubular upright 7 by which is carried the aforementioned screw 4.

It will be apparent from the foregoing that the tray 6 and the sleeve 7 are readily revoluble about the stem 2.

Superposed on the taper plug 5 and revoluble about the stem 2 and also about the sleeve 7 when the latter is deemed expedient is a revoluble member 8 that carries a sugar container 9 and a napkin container 10, the said container 10 being constructed as hereinafter described with a view to handling the well known paper napkins such as are ordinarily used in lunch rooms.

The member 8 is provided with a pendent tubular portion 11 which surrounds the sleeve 7, and it is also provided with an inclined spout 12 and a tubular portion 13 in communication with the bottom of the bowl or container 9 and the spout 12. The spout 12 is provided adjacent to its lower end with a depending fin 14$^x$ on which is a depending reduced portion 15$^x$. Manifestly by virtue of the provision of the pendent fin 14$^x$ a person is prevented from lifting a cup of coffee too high or moving the cup inwardly sufficiently far to bring about the immersion of the lower end of the spout 12 in the coffee.

The tubular portion 13 of the revoluble member 8 is preferably of rectangular form in horizontal section, as is also the housing 14 which forms a continuation of the said portion 13 and extends a considerable distance upwardly in the bowl or container 9. The bowl or container 9 is normally covered by a removable top 15, and in order to prevent sugar from entering the upper end of the portion 14 incident to replenishing of the supply of sugar in the bowl 9 the upper end of the housing 14 is closed at 16. Adjacent to the bottom of the bowl 9 the housing 14 is provided with apertures 17, and movable rectilinearly in the housing 14 and also in the tubular portion 13 of the member 8 is what I designate a transferrer 18, the said transferrer being provided at 19 with an inclined aperture which is designed when the transferrer is in its uppermost position to be in coincidence with the openings 17, and when the transferrer is in its lowermost position to be in coincidence or registration with the spout 12. The transferrer 18 is provided with a stem 20 which extends through the central aperture in the cover 15 and is provided at its upper end with a knob or finger piece 21. Loosely surrounding the stem 20 and interposed between the plug 16 and the upper end of the transferrer 18 is a coiled spring 22, the function of which is to yieldingly maintain the transferrer 18 in its uppermost position so as to prevent the flow of sugar from the bowl 9 to the spout 12. When, however, a person presses downwardly on the handle 21, and depresses the transferrer 18, sugar received in the aperture 19 while the transferrer is in its normal upper position will be permitted or caused to move downwardly with the transferrer 18 until the aperture 19 is in registration with the spout 12 whereupon the portion of sugar contained in the aperture 19 of the transferrer 18 will be permitted to flow through the spout 12. In other words, a small portion of sugar passes from the bowl 9 into the aperture 19 of the transferrer, and then when the transferrer is depressed against the action of the spring to its lowermost position, the said portion of sugar be discharged to the spout 12 to be conveyed to a cup of coffee positioned under the discharge end of the spout.

Located at the opposite side of the revoluble member 8, with reference to the spout 12, is the napkin holder of my improvement. The said napkin holder is characterized by side walls 30, and by a back or follower wall 31. Openings 32 are provided in the side walls of the napkin holder but such openings 32 are not of the essence of my invention and therefore may be used or may be altogether omitted without affecting the invention. It will be noted, however, that the walls 30 are provided with inclined slots 33 and that the rear and upper ends of the lower walls of the said slots are merged into hooks 34. The back wall or follower of the napkin holder is provided with an opening 35 above and below which are lips 36 and it will be observed that the said back wall and follower 31 is arranged immediately in advance of and fixedly or otherwise appropriately connected to rods 37, the end portions of which are disposed in the aforementioned slots 33. By virtue of this construction it will be noted that gravitational action will maintain the back wall or follower 31 snugly against the array of napkins in the napkin holder with the result that the napkins may be conveniently removed one by one through the opening 35 and yet there is little or no liability of the napkins retained in the holder being disarranged. When it is necessary to replenish the supply of napkins in the holder, the rods 37 are removed through the openings between the bills of the hooks 34, and the adjacent rear edges of the side walls of the holder, after which the back wall or follower 31 may be removed with facility, and obviously after the holder is charged with a fresh supply of napkins, the back wall or follower 31 may be placed and held against the collection of napkins, the rod ends at the same time being positioned in the slots 33, whereupon the gravitational action of the wall or follower 31 will serve to maintain the napkins in a compact and neat state.

In the use of the napkin holder portion of my invention the napkins are arranged in zig-zag manner in the holder, and are so disposed that the removal of one napkin through the opening 35 positions another napkin in readiness to be grasped by the fingers. As each napkin is withdrawn through the opening 35 there is a tendency to pull the wall or follower 31 rearwardly, and therefore in order to prevent displacement of the wall 31 at such time, the hooks 34 are provided, the said hooks 34 necessitating the edgewise lifting of the wall 31 precedent to its removal from the holder.

In the preferred embodiment of my invention, the napkin holder is fixedly connected at its lower end to the tray 6, and is similarly connected adjacent to its upper end to the tubular portion 8 of the revoluble member. From this it follows that in the present and preferred embodiment of my invention the tray 6 and the sleeve 7 are adapted to be turned about the stem 2 as one piece with the before described rotary member 8.

In the preferred employment of my novel stand, the tray 6 is to hold the ordinary array of bottles or other receptacles for vinegar, salt, pepper and mustard, the tray being, preference, made just large enough to snugly hold the said bottles or receptacles. This will be appreciated as an important advantage when it is stated that one of the purposes of my improved device is to economize in space, and to permit of the placing of all of the loose table appurtenances at one point, where either of the bottles or holders may be conveniently reached by all of the persons seated at the table.

At 40 is a box, superposed in fixed relation on the napkin holder. The said box is designed to hold matches, tooth picks or the like, and in the lower end of the forward wall of the box is an opening 41 for the discharge of match ends or other débris.

It will be appreciated from the foregoing that my novel combination device while simple and inexpensive in construction is materially advantageous because of its sanitary character, there being no liability of dust, dirt, or flies gaining access to the interior of the bowl 9, and it being also impossible for a careless person to dip a moist spoon into the mass of sugar. Moreover, the device serves to concentrate the articles ordinarily used on a dinner table or lunchroom counter in one spot, and the napkin holding portion of the device is calculated to exclude dust and dirt from the napkins, and to preclude handling of any napkin save the one that is grasped for withdrawal. The sugar in the bowl 9 is not only isolated from the atmosphere, but is so dispensed that none of the sugar is exposed to the atmosphere except that which is allowed following upward and downward movements of the transferrer 18 to pass through the spout 12.

I have entered into a detailed description of the construction and relative arrangement of parts comprised in the present and preferred embodiment of my invention in order to impart a full, clear and exact understanding of the said embodiment. I do not desire, however, to be understood as confining myself to the said specific construction and relative arrangement of parts inasmuch as in the future practice of the invention such changes or modifications may be made as clearly fall within the scope of my invention and defined in my appended claims.

Having thus described the invention, what I claim and desire to secure by Letters Patent is:—

1. The combination in a dispensing device, of a base having an upright stem, and means revoluble about said stem and including a vertical housing having a lateral discharge spout in communication with the housing, said housing also having an aperture in its side wall and an apertured closure adjacent its upper end, a container carried by and arranged about the housing and having a bottom disposed below the aperture in the side wall of the housing, a combined transferrer and cut off means movable rectilinearly in the housing and held against turning about its axis, a stem connected to the combined transferrer and cut off and extending upwardly through said apertured closure of the housing and having a finger piece at its upper end, a spring surrounding said stem and interposed between the combined transferrer and cut off and said apertured closure, and a cover removably arranged on the container and having a central aperture loosely receiving the stem of the combined transferrer and cut off.

2. A dispensing device for sugar and analogous substance having an inclined discharge spout and also having on the spout and adjacent the lower end thereof a longitudinal vertical pendent fin, said fin having a reduced depending rear portion and being relatively arranged to prevent the immersion of the lower end of the spout in coffee in a cup.

In testimony whereof I affix my signature.

LEONARD AUNES.